US012643336B2

(12) United States Patent
Kudo

(10) Patent No.: US 12,643,336 B2
(45) Date of Patent: Jun. 2, 2026

(54) PRINTING APPARATUS, METHOD FOR CONTROLLING PRINTING APPARATUS, AND STORAGE MEDIUM

(71) Applicant: CANON KABUSHIKI KAISHA, Tokyo (JP)

(72) Inventor: Naotoshi Kudo, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 220 days.

(21) Appl. No.: 18/379,716

(22) Filed: Oct. 13, 2023

(65) Prior Publication Data

US 2024/0157711 A1 May 16, 2024

(30) Foreign Application Priority Data

Nov. 14, 2022 (JP) ................................ 2022-181798

(51) Int. Cl.
*B41J 11/00* (2006.01)
*B41J 11/70* (2006.01)
(Continued)

(52) U.S. Cl.
CPC ........ *B41J 11/0065* (2013.01); *B41J 11/0022* (2021.01); *B41J 11/008* (2013.01);
(Continued)

(58) Field of Classification Search
CPC ... B41J 11/0065; B41J 11/0022; B41J 11/008; B41J 11/70; B41J 15/02; B41J 15/04; B41J 15/16; B41J 29/377; B41M 7/009
See application file for complete search history.

(56) References Cited

U.S. PATENT DOCUMENTS 9,290,023 B2 3/2016 Kudo
9,440,463 B2 9/2016 Kudo
(Continued)

FOREIGN PATENT DOCUMENTS

JP 2017-052096 A 3/2017
JP 2017080917 A * 5/2017

OTHER PUBLICATIONS

English Translation JP-2017080917-A (Year: 2017).*
European Search Report mailed Apr. 3, 2024, in related European Patent Application No. 23204779.5.

*Primary Examiner* — Shelby L Fidler
*Assistant Examiner* — Tracey M McMillion
(74) *Attorney, Agent, or Firm* — VENALBLE LLP

(57) ABSTRACT

A printing apparatus controls printing for a first job and a second job on a printing medium. At least a part of the second job is printed in a predetermined area continued from an area to print the first job on the printing medium before a deliverable for the first job is detached. After printing is finished in a predetermined area, the printing medium is conveyed in an opposite direction of a supply direction in which the printing medium is supplied. A predetermined length is added to the predetermined area and is obtained by adding a length of conveyance of the printing medium until a conveyance speed is stabilized to a length of conveyance of the printing medium after a temperature of a liquid drying unit becomes equal to or greater than a certain temperature and until the temperature reaches a target temperature.

11 Claims, 11 Drawing Sheets

(51) Int. Cl.

| | |
|---|---|
| ***B41J 15/02*** | (2006.01) |
| ***B41J 15/04*** | (2006.01) |
| ***B41J 15/16*** | (2006.01) |
| ***B41J 29/377*** | (2006.01) |
| ***B41M 7/00*** | (2006.01) |

(52) U.S. Cl.

CPC ............... *B41J 11/70* (2013.01); *B41J 15/02* (2013.01); *B41J 15/04* (2013.01); *B41J 15/16* (2013.01); *B41J 29/377* (2013.01); *B41M 7/009* (2013.01)

(56) References Cited

U.S. PATENT DOCUMENTS

| | | | | |
|---|---|---|---|---|
| 9,891,569 | B2 | 2/2018 | Konishi | |
| 2012/0262759 | A1* | 10/2012 | Kudo | B41J 11/36 358/1.18 |
| 2013/0270062 | A1* | 10/2013 | Takeuchi | B41J 11/008 198/340 |
| 2017/0068195 | A1* | 3/2017 | Konishi | G03G 15/55 |

* cited by examiner

PRINTING APPARATUS, METHOD FOR CONTROLLING PRINTING APPARATUS, AND STORAGE MEDIUM

BACKGROUND OF THE INVENTION

Field of the Invention

The present invention relates to a printing apparatus capable of performing printing on a roll sheet and detaching a deliverable from a winding device for each job, a method for controlling the printing apparatus, and a storage medium.

Description of the Related Art

In general, in an image forming apparatus which performs printing on a roll sheet while winding the roll sheet by a winding device, the printed roll sheet is cut after printing, a deliverable is detached from the winding device, a front end of the sheet left after cutting is attached to the winding device, and printing is performed anew.

Japanese Patent Laid-Open No. 2017-52096 states that after the completion of printing for a first job, printing is stopped, a sheet is cut, a deliverable is detached from a device, a front end of the cut sheet is then attached to a winding device, and printing for a second job, which is a job subsequent to the first job, is started.

In the method described in Japanese Patent Laid-Open No. 2017-52096, however, since a sheet between the printing unit and the sheet front end attached to the winding device has already passed the printing unit at the time of printing for the second job, the sheet cannot be printed and is left blank, which results in production of waste paper.

SUMMARY OF THE INVENTION

Thus, the present invention provides a printing apparatus capable of reducing the production of waste paper, a method for controlling the printing apparatus, and a storage medium.

The printing apparatus of the present invention is therefore a printing apparatus having: a printing unit configured to perform printing on a printing medium drawn out and conveyed from a roll based on an input job; a winding unit configured to wind the printing medium printed by the printing unit into a roll; and a control unit configured to control printing for a first job and printing for a second job subsequent to the first job on the printing medium, wherein the printing apparatus further comprises a setting unit configured to set whether a deliverable for the first job wound by the winding unit is to be detached after printing for the first job is finished, and in a case where the setting unit makes a setting to detach the deliverable, the control unit performs control such that at least a part of the second job is printed in a predetermined area continued from an area to print the first job on the printing medium before the deliverable for the first job is detached.

According to the present invention, a printing apparatus capable of reducing the production of waste paper, a method for controlling the printing apparatus, and a storage medium can be provided.

Further features of the present invention will become apparent from the following description of exemplary embodiments with reference to the attached drawings.

DESCRIPTION OF THE EMBODIMENTS

Embodiments of the present invention will be described below with reference to the drawings.

Figure 1:
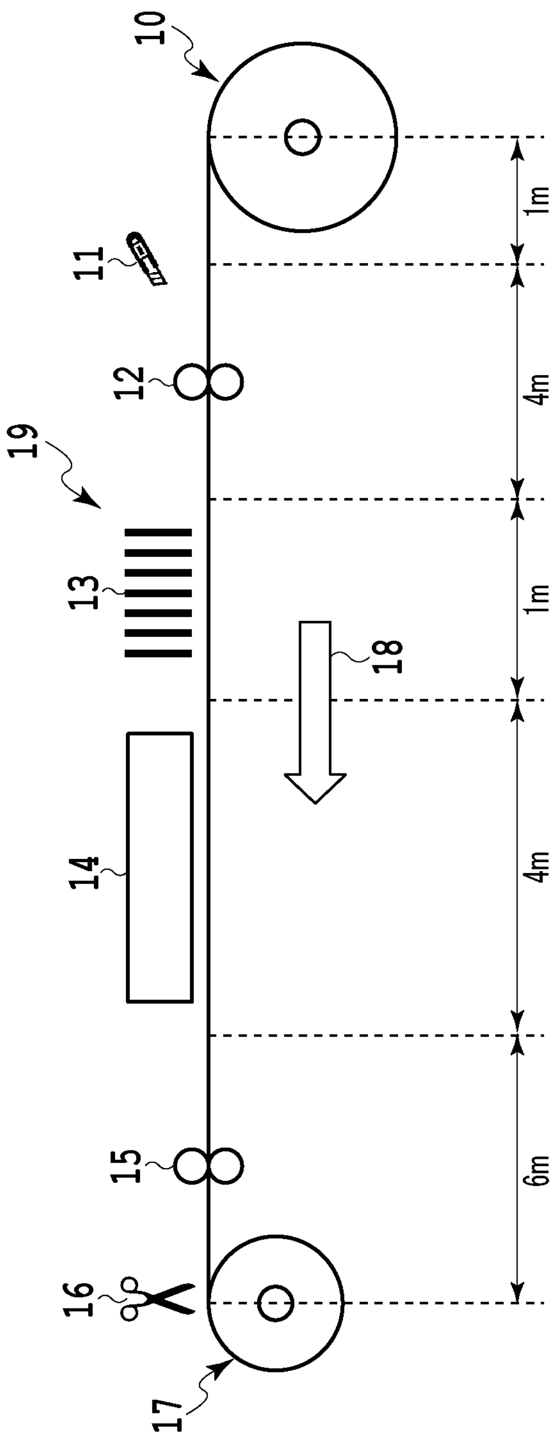
FIG. 1 is a diagram schematically showing a conveyance path in an image printing apparatus.

FIG. 1 is a diagram schematically showing a conveyance path of a roll sheet (hereinafter also referred to as a sheet) in a case where an image printing apparatus (hereinafter also simply referred to as a printing apparatus) of the present embodiment is on standby. Although FIG. 1 schematically shows the conveyance path as a linear conveyance path to facilitate understanding, the sheet is actually conveyed in a direction of arrow 18 through a printing unit 19 in which printing is performed, then lowered, and dried and cooled while being conveyed in the opposite direction of arrow 18. After that, the sheet is further lowered and conveyed in the direction of arrow 18. Thus, the conveyance path actually has an approximate S-shape as a whole.

The printing apparatus comprises a feeding device 10, a splicing unit 11, a main conveying unit 12, the printing unit 19 comprising a head 13, a fixing unit 14, a sub-conveying unit 15, a cutting unit 16, and a winding device 17. Between the feeding device 10 and the main conveying unit 12 and between the sub-conveying unit 15 and the winding device 17 is provided an unshown dancer roller which moves upward and downward according to a sheet tension such that the sheet is under a predetermined tension. The main conveying unit 12 and the sub-conveying unit 15 may be provided at different positions or may be omitted in some cases. In a case where neither the main conveying unit 12 nor the sub-conveying unit 15 is provided, the roll sheet is conveyed by a feeding operation from the feeding device 10 and a winding operation by the winding device 17.

A roll sheet is attached to the feeding device 10 and the sheet is drawn out and supplied from the roll sheet. In the present embodiment, a roll sheet of 1000 m is attached to the feeding device 10. The splicing unit 11 is provided about 1 m downstream of the sheet supplied from the feeding device 10. At the time of replacement of the roll sheet, a user cuts the sheet with the splicing unit 11 and replaces the sheet in the feeding device 10 with a new one. After that, the rear end of the cut sheet remaining in the apparatus is joined to the front end of the new sheet with a splicing tape. In this manner, sheet replacement can be performed only by passing a new roll sheet from the feeding device 10 to the splicing unit 11.

A sheet conveyed through the printing apparatus is nipped by rollers at the main conveying unit 12 and the sub-conveying unit 15 and conveyed by rotation of each roller. The printing unit 19 comprising the head 13 is provided downstream of the main conveying unit 12. Printing (hereinafter also referred to as printing) is performed by ejection of liquid (hereinafter also referred to as ink) from the head 13 to the sheet conveyed in the print direction (supply direction) of arrow 18. After printing is performed, the fixing unit 14 dries and cools the ink ejected to the sheet. The fixing unit 14 has a drying area and a cooling area. In the drying area, a drier equipped with a heater and fan dries the ejected ink. After drying, in the cooling area, a cooler equipped with a fan cools the heated sheet and the ink ejected to the sheet. After cooling, the sheet passes through the sub-conveying unit 15 and is wound into a roll by the winding device 17.

After the completion of printing, in a case where a deliverable on which printing has been completed is detached from the winding device 17, a user cuts the sheet at the cutting unit 16 and detaches the deliverable. After that, the front end of the sheet remaining in the main body after cutting is attached to the winding device 17 with a tape or the like for next printing.

Figure 2:
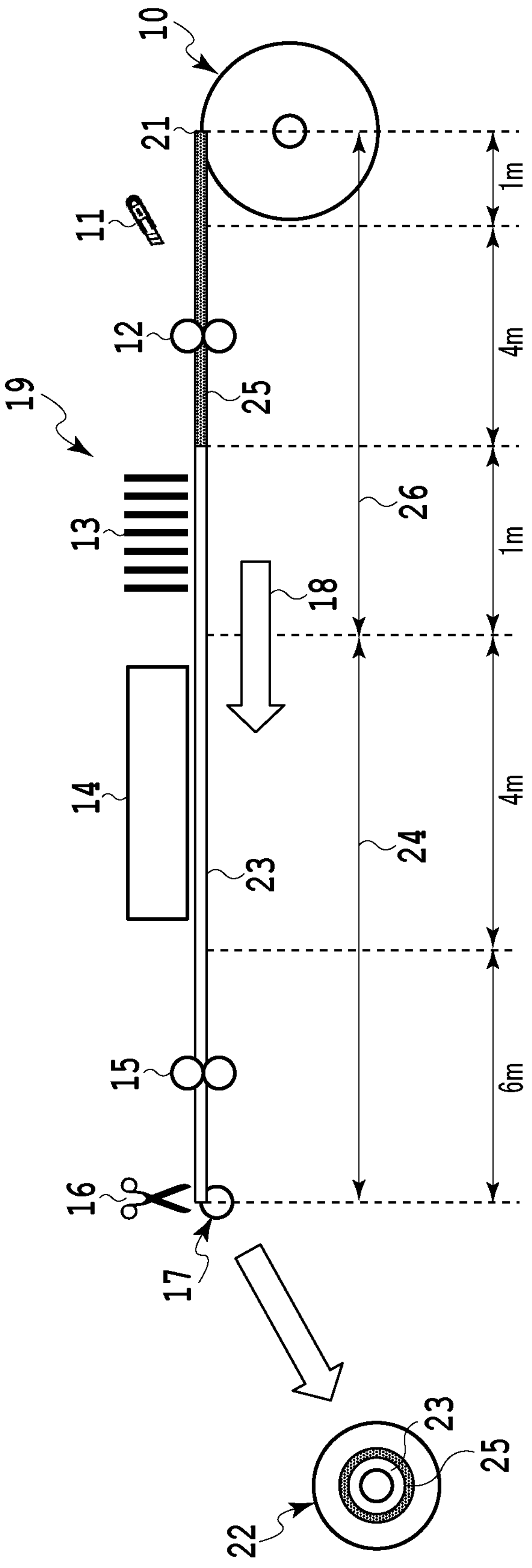
FIG. 2 is a diagram schematically showing a conveyance path in an image forming apparatus in a conventional method.

FIG. 2 is a diagram schematically showing a conveyance path in a case where a deliverable 22 is detached, the front end of the remaining sheet is attached to the winding device 17, and printing is performed in a conventional method. It is assumed that the printing apparatus is the same apparatus as that shown in FIG. 1. As has been explained with reference to FIG. 1, after printing is performed, a user cuts the sheet with a cutter, scissors, or the like at the cutting unit 16 and detaches the deliverable 22 from the winding device 17. The front end of the sheet remaining in this state is attached to the winding device 17. Although depending on the configuration of equipment, sheet feeding may be necessary at the time of attachment according to the cutting position. In the present embodiment, it is assumed that sheet feeding is not performed for the sake of simplification.

With the front end of the sheet attached to the winding device 17, the sheet can be fed in the print direction of arrow 18 but cannot be rewound in the opposite direction of the print direction. Here, a blank area 23 of the sheet between the position of attachment to the winding device 17 and a printing start position of the printing unit 19 is substantially downstream of the printing unit 19 and therefore cannot be printed. For example, in a case where the printing apparatus of the present embodiment is used, a blank area length 24 of the blank area 23 is 11 m ((sub-conveying unit: 6 m)+(fixing unit: 4 m)+(printing unit: 1 m)). Specific lengths shown below are based on the assumption that the printing apparatus of the present embodiment is used, for example.

In addition, in the case of a sheet with an adhesive between a print sheet and release paper such as a sticker, if a temperature rises while conveyance is stopped in the dryer of the fixing unit 14, the adhesive may be dried and the sheet may lose the function of a sticker. Thus, in the fixing unit 14, after the temperature of the dryer becomes equal to or greater than a certain temperature, the conveyance of the sheet needs to be continued without being stopped until the temperature reaches a target temperature. As a result, there is a need for a conveyance length (4 m) such that the sheet is conveyed after the temperature of the dryer becomes equal to or greater than the certain temperature and until the temperature reaches the target temperature. Further, at the time of ink ejection from the head 13 for printing, it is also necessary to feed the sheet stably at a certain speed. The acceleration to the certain speed and the stabilization of the speed require a predetermined conveyance length (1 m).

A conveyance length of the sheet necessary for printing, which is the sum of the necessary conveyance length resulting from ink drying and the necessary conveyance length resulting from the conveyance speed as stated above, is defined as a printing necessary conveyance length 26, and a printing necessary conveyance area 25 is provided as the corresponding area. Incidentally, although the printing necessary conveyance area 25 also includes a conveyance length which may be necessary for attachment of the front end of the sheet to the winding device 17 to be described later, it is assumed here that the conveyance length necessary for attachment is 0 m for the sake of simplification. Thus, the printing necessary conveyance length 26 is assumed to be 5 m (4 m+1 m).

Accordingly, a position in the sheet at which printing can be started is a position shown as a print start position 21. The center of the roll of the conventional deliverable 22 printed from this state has a blank sheet corresponding to the printing necessary conveyance area 25 subsequent to the blank area 23. Printing is started from the print start position 21 subsequent to the blank sheet. As a result, waste paper (blank) of 11 m+5 m=16 m is produced at the center of the deliverable.

Thus, in the present embodiment, it is determined whether a deliverable is to be detached after job completion (after printing completion), and if the deliverable is to be detached, at least part of the next job is printed on a predetermined area subsequently to the previous job, thereby reducing the production of waste paper. Incidentally, in the following description, an area obtained by combining the blank area 23 with the printing necessary conveyance area 25 is defined as an additional print area, and a length of the area obtained by combining the blank area length 24 with the printing necessary conveyance length 26 is defined as an additional printing distance. A method therefor will be described below in detail.

Figure 3:
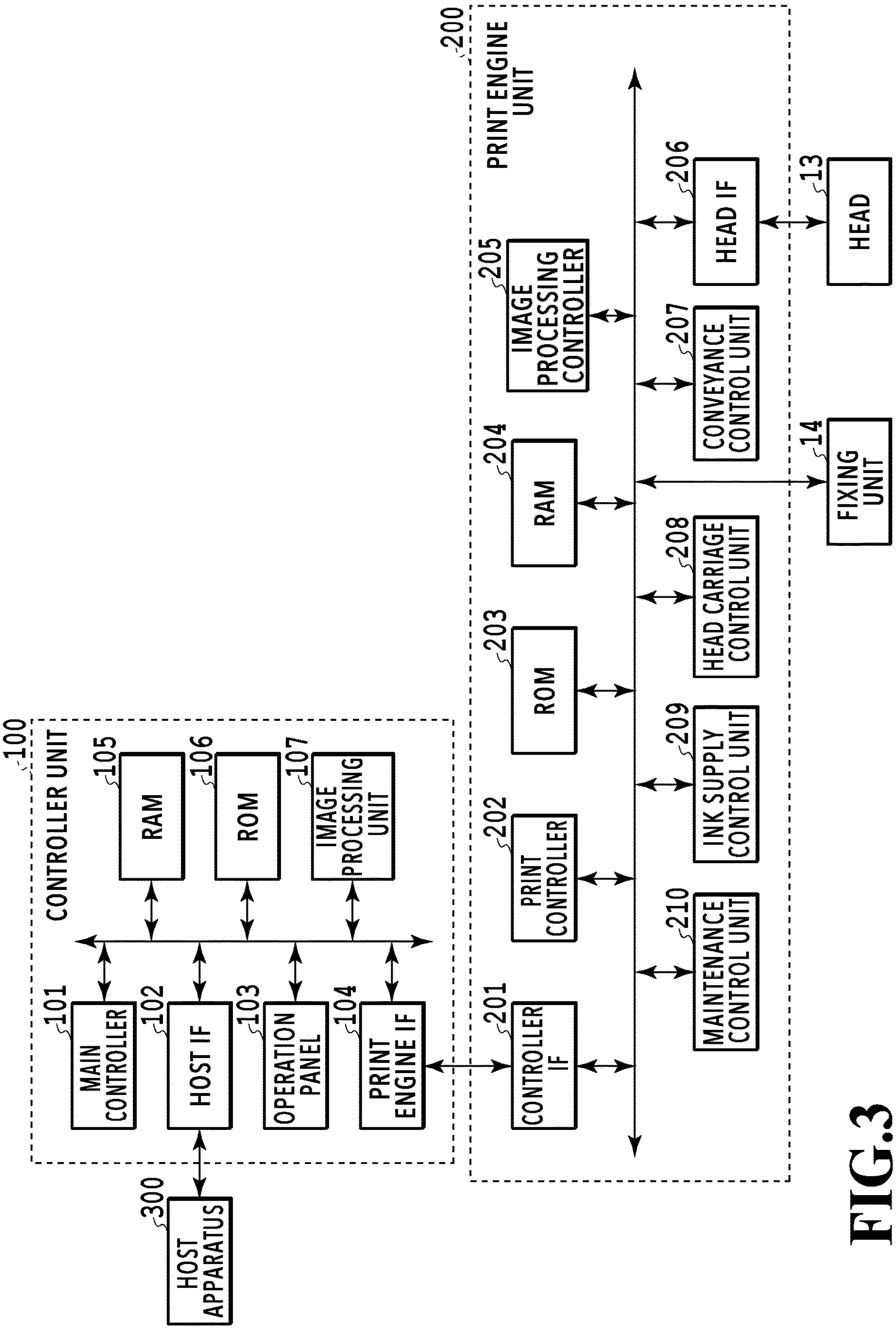
FIG. 3 is a block diagram showing a control configuration in a printing apparatus.

FIG. 3 is a block diagram showing a control configuration in the printing apparatus of the present embodiment. The control configuration in the printing apparatus mainly comprises a print engine unit 200 which has control over a print engine and a controller unit 100 which has control over the entire printing apparatus. A print controller 202 controls various mechanisms of the print engine unit 200 under instructions from a main controller 101 of the controller unit 100. The control configuration will be described below in detail.

The controller unit 100 comprises the main controller 101, a host OF 102, an operation panel 103, a print engine OF 104, a RAM 105, a ROM 106, and an image processing unit 107. In the controller unit 100, the main controller 101 including a CPU controls the entire printing apparatus according to programs and various parameters stored in the ROM 106 while using the RAM 105 as a work area. For example, in a case where a print job is input from a host apparatus 300 via the host OF 102, the image processing unit 107 applies predetermined image processing to the received image data under instructions from the main controller 101.

The main controller 101 then transmits the image data which has undergone the image processing to the print engine unit 200 via the print engine OF 104. Incidentally, the printing apparatus may obtain image data from a connected external storage device (such as a USB memory).

The operation panel 103 is a mechanism which allows a user to perform input/output for the printing apparatus. A user can give an instruction for a printing or sheet feeding operation, set a print mode, and recognize information on the printing apparatus via the operation panel 103. The operation panel 103 is a touch panel and can be connected to a mouse or keyboard for input.

The print engine unit 200 comprises a controller OF 201, a print controller 202, a ROM 203, a RAM 204, an image processing controller 205, a head OF 206, and a conveyance control unit 207. The print engine unit 200 also comprises a head carriage control unit 208, an ink supply control unit 209, and a maintenance control unit 210.

In the print engine unit 200, the print controller 202 including a CPU controls various mechanisms of the printing apparatus according to programs and various parameters stored in the ROM 203 while using the RAM 204 as a work area. In a case where a command or image data is received via the controller OF 201, the print controller 202 temporarily stores it in the RAM 204. The print controller 202 causes the image processing controller 205 to convert the image data stored in the RAM 204 into printing data such that the head 13 can use it for a printing operation. After the printing data is generated, the print controller 202 causes the head 13 to perform a printing operation based on the printing data via the head OF 206. At this time, the print controller 202 drives the feeding device 10, main conveying unit 12, sub-conveying unit 15, and winding device 17 shown in FIG. 1 via the conveyance control unit 207 to convey a roll sheet that is a printing medium. Under instructions from the print controller 202, a printing operation is performed by the head 13 in conjunction with a conveyance operation of the roll sheet and a printing process is performed.

The head 13 is configured to move upward and downward. The head 13 is lowered at the time of printing as shown in FIG. 1 but is raised at the time of maintenance or the like. The head carriage control unit 208 changes the vertical position of the head 13 according to an operation state of the printing apparatus such as a maintenance state or a printing state. The ink supply control unit 209 controls an unshown ink supply unit such that a pressure of ink supplied to the head 13 is within a suitable range. In a case where a maintenance operation is performed for the head 13, the maintenance control unit 210 puts a maintenance unit under the raised head and controls maintenance operations for the head 13 such as capping and wiping.

The fixing unit 14 is controlled such that it dries and cools ink ejected to a roll sheet. In a case where ink is ejected from the head 13 of the printing unit 19, a sheet is conveyed until it passes through the fixing unit 14, whereby the ink is dried and cooled.

Figure 4:
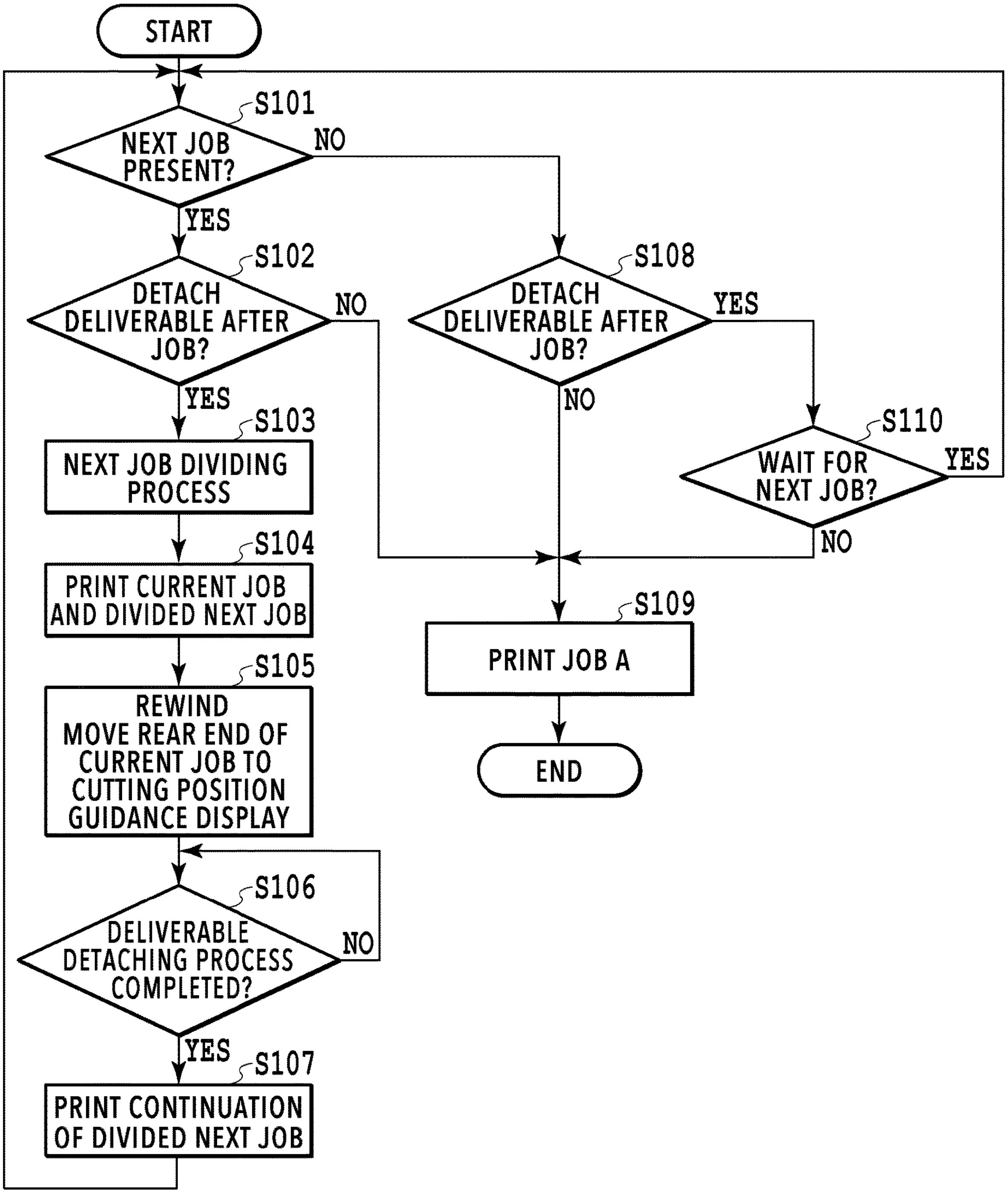
FIG. 4 is a flowchart showing a print sequence.
Figure 11:
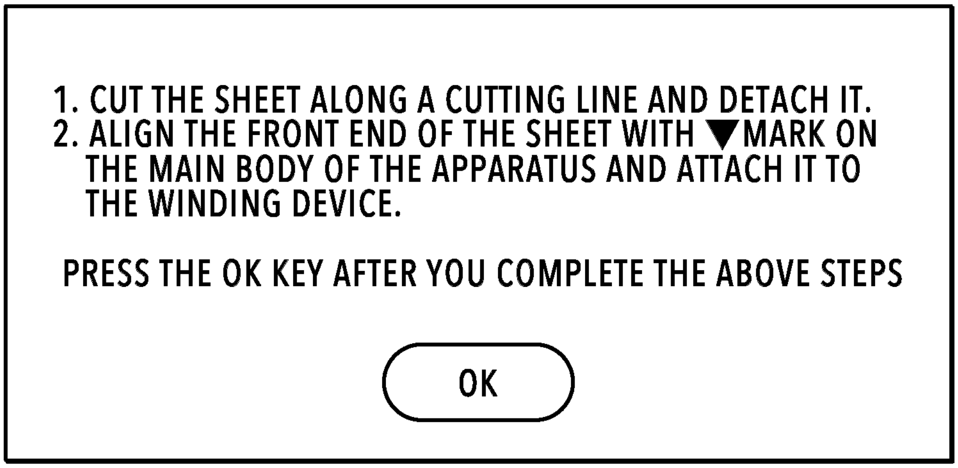
FIG. 11 is a diagram showing a guidance screen for a user displayed on an operation panel.

FIG. 4 is a flowchart showing a print sequence in the printing apparatus of the present embodiment. FIGS. 5A to 5D and 6A to 6C are diagrams schematically showing a conveyance path in the print sequence. FIGS. 5A to 5D and FIGS. 6A to 6C are provided as different figures but show the conveyance path in the continuous print sequence. FIG. 11 is a diagram showing a guidance screen 110 for a user displayed on the operation panel 103. The print sequence of the present embodiment will be described below using the flowchart of FIG. 4 with reference to FIGS. 5A to 5D, 6A to 6C, and 11.

A series of processes shown in FIG. 4 is performed by the CPU of the main controller 101 loading a program code stored in the ROM 106 into the RAM 105 and executing the program code. Alternatively, part or all of the functions of the steps in FIG. 4 may be implemented by hardware such as an ASIC or electronic circuit. Incidentally, the sign "S" in the explanation of each process means a step in the flowchart.

If a print command for job A is input and the print sequence is started, the CPU determines in S101 whether a print job (hereinafter job B) subsequent to the current print job (hereinafter job A) for which printing has been started is transmitted from the host apparatus 300. The CPU transitions to S102 if job B is transmitted from the host apparatus 300, and transitions to S108 if job B is not present. If the CPU transitions from S101 to S102, the CPU determines whether to detach a printed sheet wound by the winding device 17 after the printing for job A. This determines whether a deliverable 51 for job A printed and wound by the winding device 17 is to be detached after the completion of printing for job A (after completion of printing), as shown by the arrow in FIG. 5D.

This determination whether to detach the sheet is made, for example, based on whether a user has marked a checkbox (setting unit) for setting whether to detach the sheet after printing in print setting at the time of transmitting the print job from the host apparatus 300. This may be in a different form; for example, settings may be made in advance such that the sheet is detached for each job. Irrespective of the setting method, the determination is made based on a setting that has been determined by a user as to whether to detach the sheet after printing for job A.

If the CPU determines in S102 to detach the sheet after the job, the CPU transitions to S103 and makes image adjustments and settings for job B and subsequent jobs at the image processing unit (adjusting unit) 107. The image adjustment here means adjusting image data corresponding to an additional print area (additional printing area) based on job B and subsequent jobs. For example, a dividing process is performed for job B in correspondence with the additional print area. The dividing process here divides part of image data for job B corresponding to the additional print area from the rest of the image data. The divided part of image data is set as image data to be printed in the additional print area.

Although not explained in detail for the sake of simplification, if job B does not have a sufficient amount of data for printing in the additional print area and cannot fill the additional print area even by printing, a part or all of job C, which is a job subsequent to job B (a job subsequent to the second job), may also be included in the additional print area. If job C is not present, job C may be waited for.

Further, since a blank portion may be necessary in some cases in order to secure an area for cutting at the time of detachment of the deliverable or for taping to the winding device 17, a user may be allowed to select printing while leaving a blank portion without waiting for job C. Further, although an amount of rewinding increases at the time of detachment of the deliverable 51 for job A in the subsequent sequence, even if job B has a sufficient amount of data for the additional print area, settings may be made such that job B is not divided and is entirely printed beyond the additional print area.

In the present embodiment, after printing for job A, printing corresponding to the additional print area is performed (printing is not performed beyond the additional print area), thereby reducing the amount of rewinding and time required for rewinding. If the amount of conveyance and the amount of rewinding increase, the apparatus exerts an influence such as skew feeding. Thus, printing corresponding to the additional print area is performed to suppress extra printing and reduce the influence of the apparatus.

In this manner, the image processing unit 107 makes image adjustments and settings for job B and subsequent jobs such that printing is performed in the additional print area which was conventionally waste paper. After that, in S104, the CPU prints image data including job B adjusted and set in S103 in the additional print area subsequently to the printing for job A.

Figure 5A:
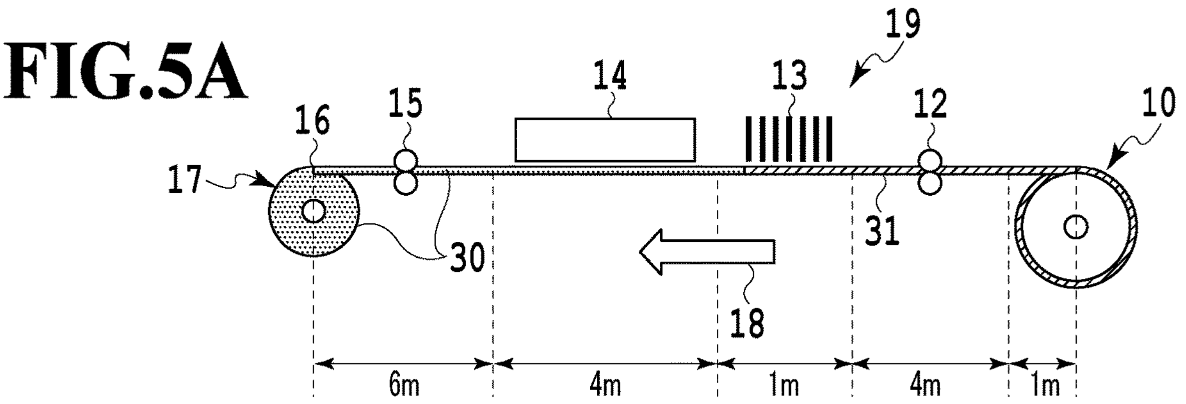
FIG. 5A is a diagram schematically showing a conveyance path showing a print sequence.
Figure 5B:
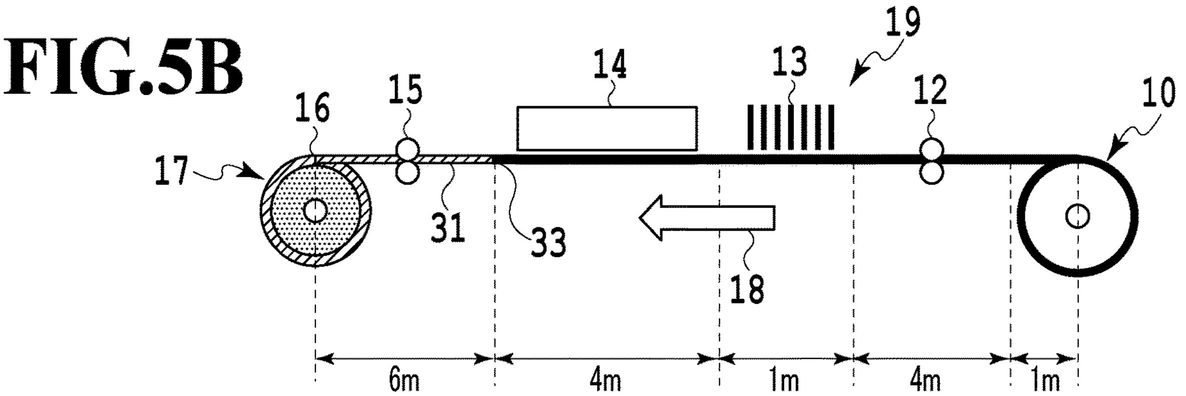
FIG. 5B is a diagram schematically showing a conveyance path showing a print sequence.

FIG. 5A shows a state of completion of printing for job A, where printing for job A has been performed in an area 30 between the winding device 17 and the downstream position of the head 13 including a portion wound in the winding device 17. From this state, in S104, printing for job B adjusted and set in S103 is further performed in an additional print area 31. Since drying and cooling should be performed continuously after printing, conveyance is continued until the printed portion passes the fixing unit 14 and is then stopped. FIG. 5B is a diagram showing a state in which the additional print area 31 has been printed and a rear end 33 of the additional print area 31 has exited from the fixing unit 14. In the state of FIG. 5B, a portion that is the rear end of job A and is to be cut at the time of detachment of the deliverable is wound in the winding device 17 and the rear and of job A (the portion to be cut) cannot be cut. Thus, rewinding is performed until the portion to be cut at the rear end of job A gets to the cutting unit 16 (up to a position in which the portion can be cut).

In S105, the CPU rewinds the rear end of job A to the cutting unit 16 by rewinding under the control of the conveyance control unit 207. After the completion of rewinding, the CPU causes the operation panel 103 to display a guidance screen 110 to prompt a user to detach the deliverable (see FIG. 11).

Figure 5C:
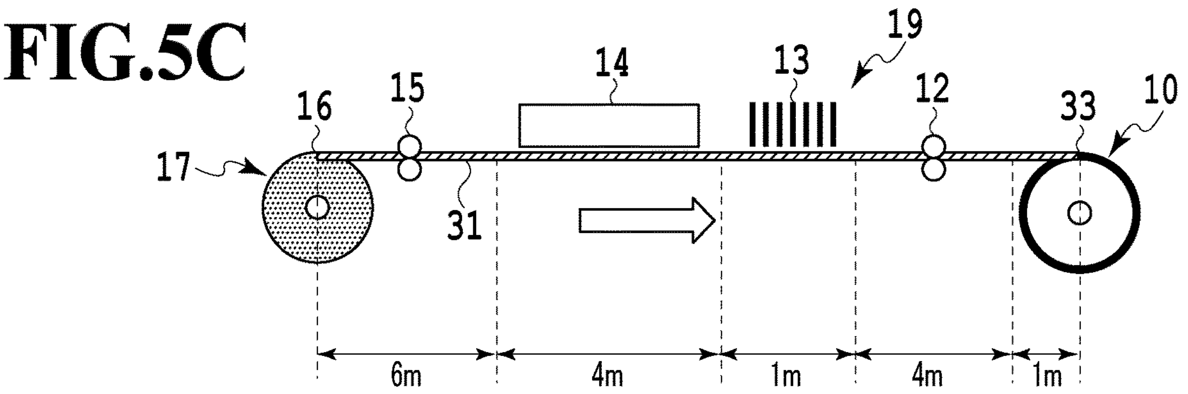
FIG. 5C is a diagram schematically showing a conveyance path showing a print sequence.

FIG. 5C shows a state in which the rear end of job A has been rewound to the cutting unit 16. The guidance screen 110 on the operation panel 103 shows cutting the sheet along a cutting line and detaching it, aligning the front end of the sheet with an inverted triangle mark on the main body of the winding device and attaching it to the winding device 17, and pressing an OK key after the completion of attachment. A user cuts the roll sheet at the rear end of job A with scissors, a cutter, or the like. A cutting line is printed at the rear end of job A and the user cuts the roll sheet along the cutting line. The cutting line will be described later in detail.

Figure 5D:
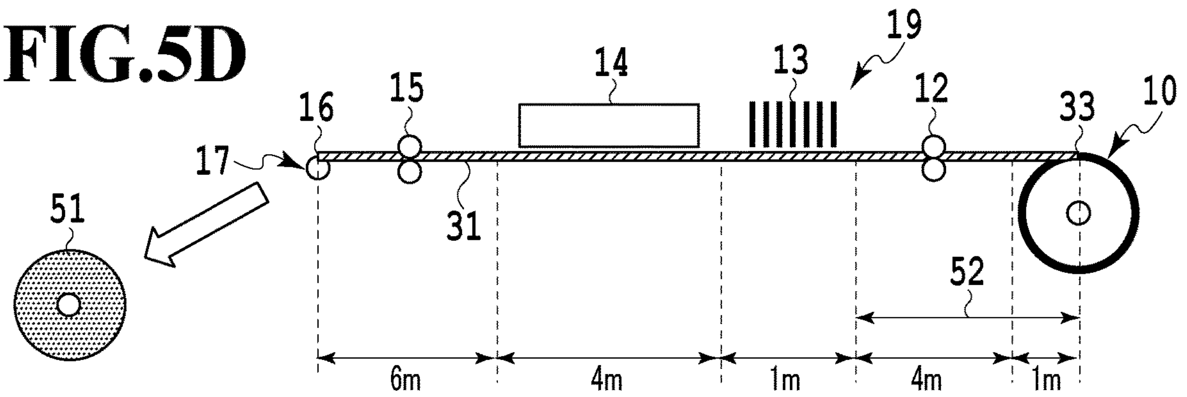
FIG. 5D is a diagram schematically showing a conveyance path showing a print sequence.

Next, as shown in FIG. 5D, the user detaches the deliverable 51, which is a roll sheet printed for job A, from the winding device 17. After that, the user attaches, to the winding device 17, the front end of the print area for job B left after cutting. A specific method for attaching is as follows. First, a paper tube is attached to the winding device 17 and the front end of the sheet is attached to the paper tube with a tape or the like. The user then feeds the sheet as necessary by means of an unshown sheet feeding button on the operation panel 103 and attaches the sheet to the winding device 17 under the guidance of the guidance screen 110 on the operation panel 103. After the completion of attachment, the user presses the OK key on the operation panel 103. As a result, the sheet printed for job B can be wound by the winding device 17 almost without waste paper at the beginning of winding. Further, in this state, at least a part of the area for job B has been printed on the sheet and printing can be started from an area continued from the printed area.

Figure 6A:
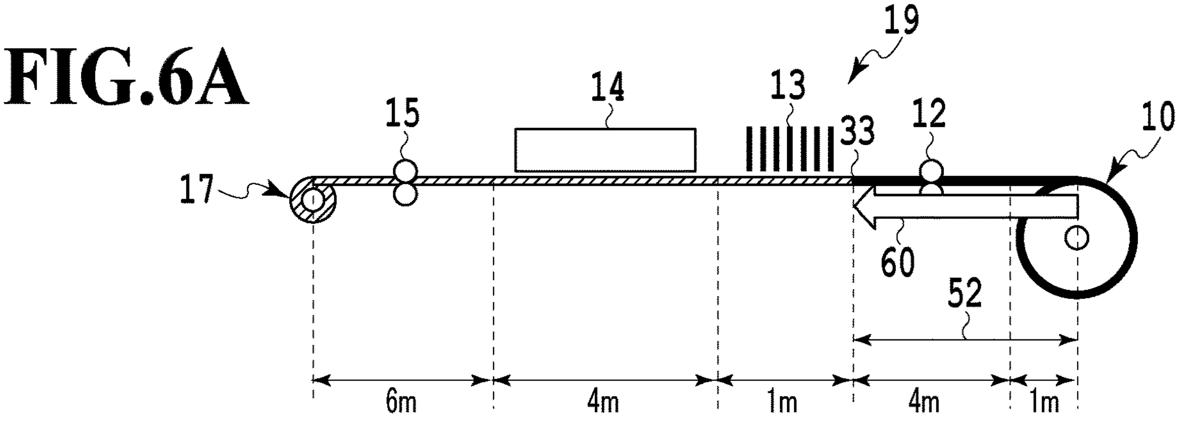
FIG. 6A is a diagram schematically showing a conveyance path showing a print sequence.

After that, the CPU determines in S106 whether the process of detaching the deliverable has been completed based on whether the OK key has been pressed on the operation panel 103. In S106, the determination is repeated until the OK key is pressed. If the OK key is pressed, the CPU transitions to S107, performs a predetermined amount of conveyance, and starts the subsequent printing for job B from an area continued from the area which has been already printed partway for job B. FIG. 6A is a diagram showing a state in which a predetermined amount of sheet is conveyed from the state of FIG. 5D and printing is restarted from the middle of job B. In this state, printing is restarted from the rear end of the partial print area for job B (the rear end 33 of the additional print area 31).

Figure 6B:
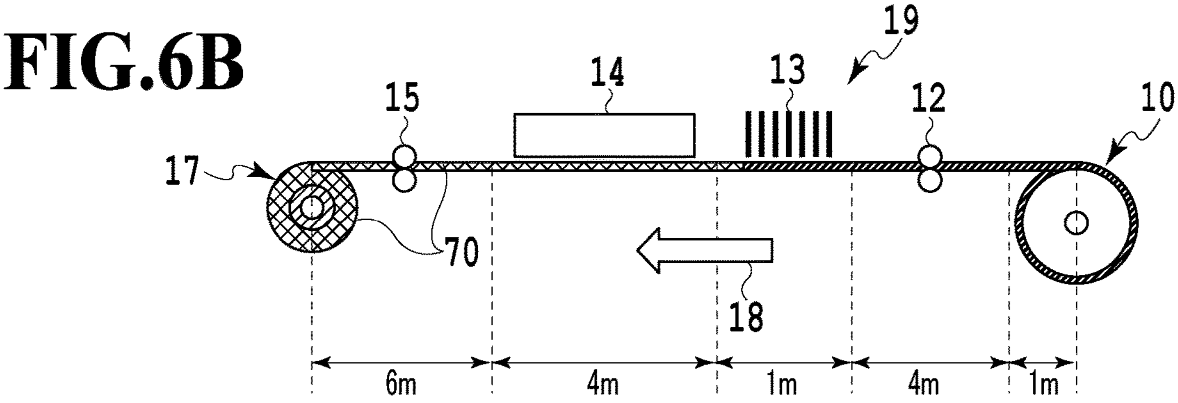
FIG. 6B is a diagram schematically showing a conveyance path showing a print sequence.
Figure 6C:
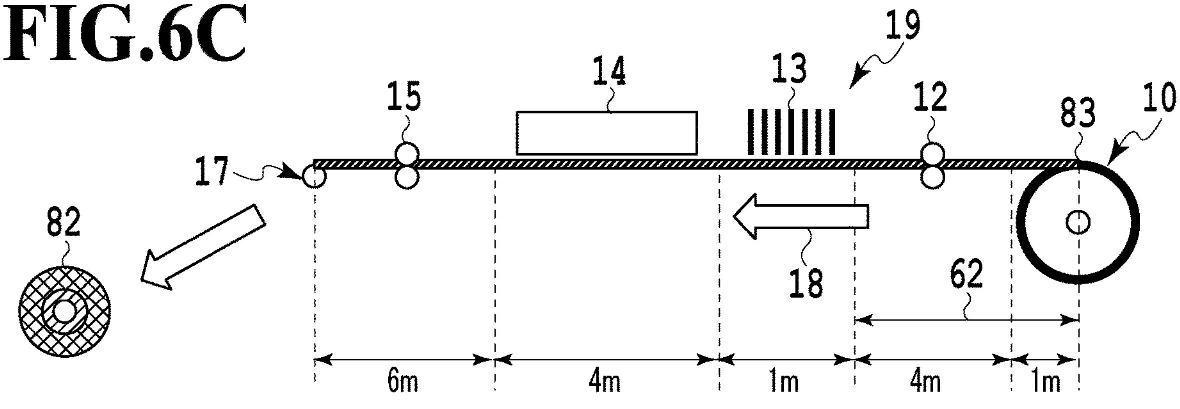
FIG. 6C is a diagram schematically showing a conveyance path showing a print sequence.

After S107, the CPU returns to S101 and repeats the process. FIG. 6B is a diagram showing a state of completion of printing for job B, where the printing for job B has been completed in an area 70 between the winding device 17 and the downstream position of the head 13 including a portion wound in the winding device 17. FIG. 6B shows the same situation as that of FIG. 5A for a different job. FIG. 6C is a diagram showing a state in which a predetermined amount of conveyance has been performed after the completion of printing for job B and shows the same situation as that of FIG. 5D for a different job. As shown in FIG. 6C, after the completion of printing for job B, the user detaches a deliverable 82, which is a printed roll sheet wound in the winding device 17.

After the CPU transitions from S101 to S108 (if job B is not present), the CPU determines whether to detach the printed sheet wound in the winding device 17 after the printing for job A. This is the same process as that in S102. If the CPU determines in S108 not to detach the sheet, the CPU transitions to S109, performs printing for job A, and finishes the process (printing process). Similarly, if the CPU determines in S102 not to detach the sheet after the job, the CPU transitions to S109, performs normal printing, and finishes the process.

If the CPU determines in S108 to detach the sheet, the CPU transitions to S110 and determines whether to wait for job B, which is the next job. If the CPU waits for the next job in S110, the CPU repeats waiting until the next job comes. If the next job comes, the CPU transitions from S101 to S102 and repeats the process from S102. If the CPU determines in S110 not to wait for the next job, the CPU transitions to S109, performs normal printing, and finishes the process.

Incidentally, the CPU performs normal printing in S109 after passing through S101, S108, and S110 in a case where a user accepts waste paper and wants to detach the deliverable immediately after printing. In this case, since jobs cannot be continuously printed as shown in the conventional example of FIG. 2, a deliverable for the next job is allowed to have a blank resulting from a blank area and a conveyance area necessary for printing and waste paper is allowed to be produced.

Figure 7:
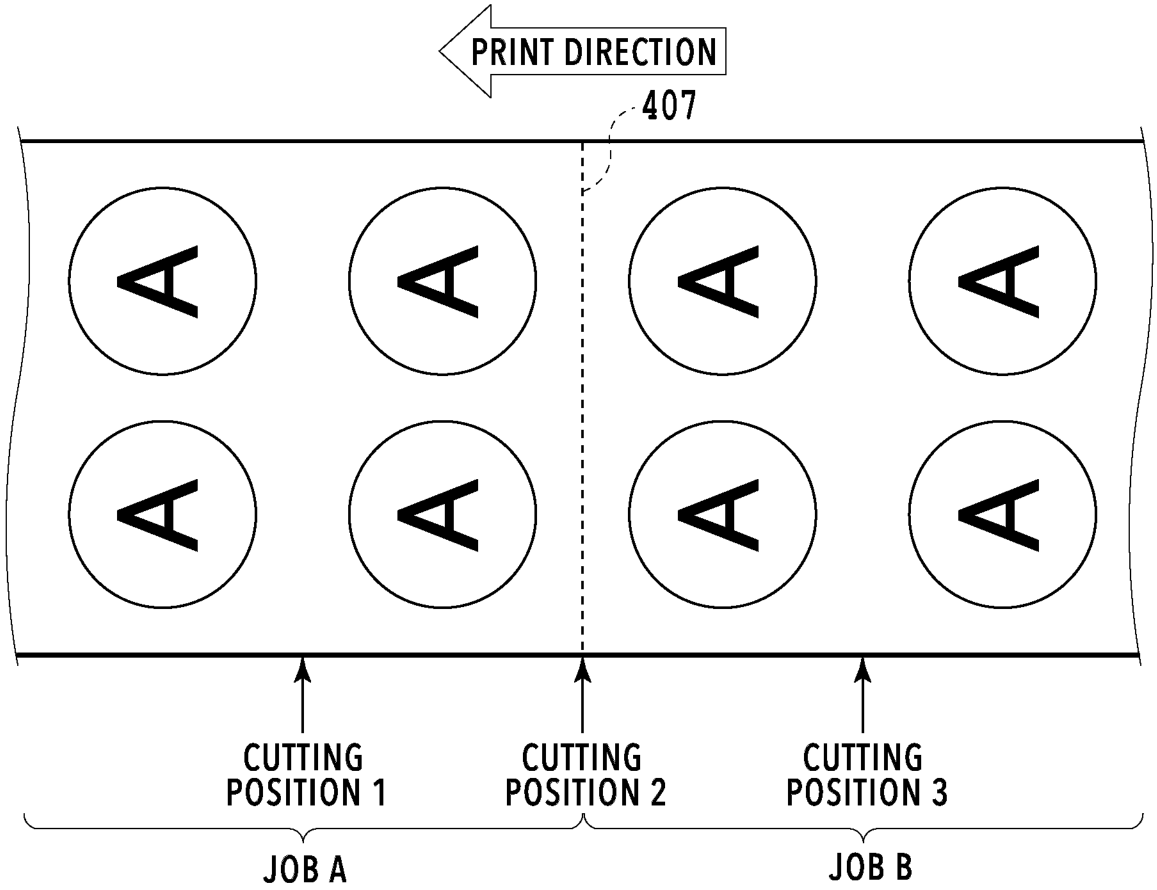
FIG. 7 is a diagram showing a printed sheet at a cutting unit.

FIG. 7 is a diagram showing a printed sheet at the cutting unit 16. In the case of detaching a printed deliverable, a user cuts the sheet at the cutting unit 16. In a case where a deliverable for job A is detached, the sheet is cut between job A and job B at the cutting unit 16. However, if job A and job B have the same printing content, it may be difficult for a user to recognize the boundary between job A and job B. In a case where the printing apparatus automatically cuts the sheet, there is no problem since the printing apparatus senses a cutting position and cuts the sheet. In a case where a user cuts the sheet, however, the unclarity of a cutting position may cause a problem. As shown in FIG. 7, even if the printing apparatus conveys the rear end of the print area for the job to the cutting unit 16, it may be impossible for a user to decide which of the cutting positions 1 to 3 should be used as a cutting position to cut the sheet.

Thus, the printing apparatus of the present embodiment prints a cutting line 407 to be a cutting mark at the cutting position (cutting position 2) between job A and job B. By thus printing the cutting line 407, a user can recognize the boundary between job A and job B from the cutting line 407. The user can detach the deliverable at a correct position by cutting the sheet along the cutting line 407. Incidentally, although the cutting line 407 is described as an example in the present embodiment, any object other than a line may be used as long as it functions as a cutting mark.

Figure 8:
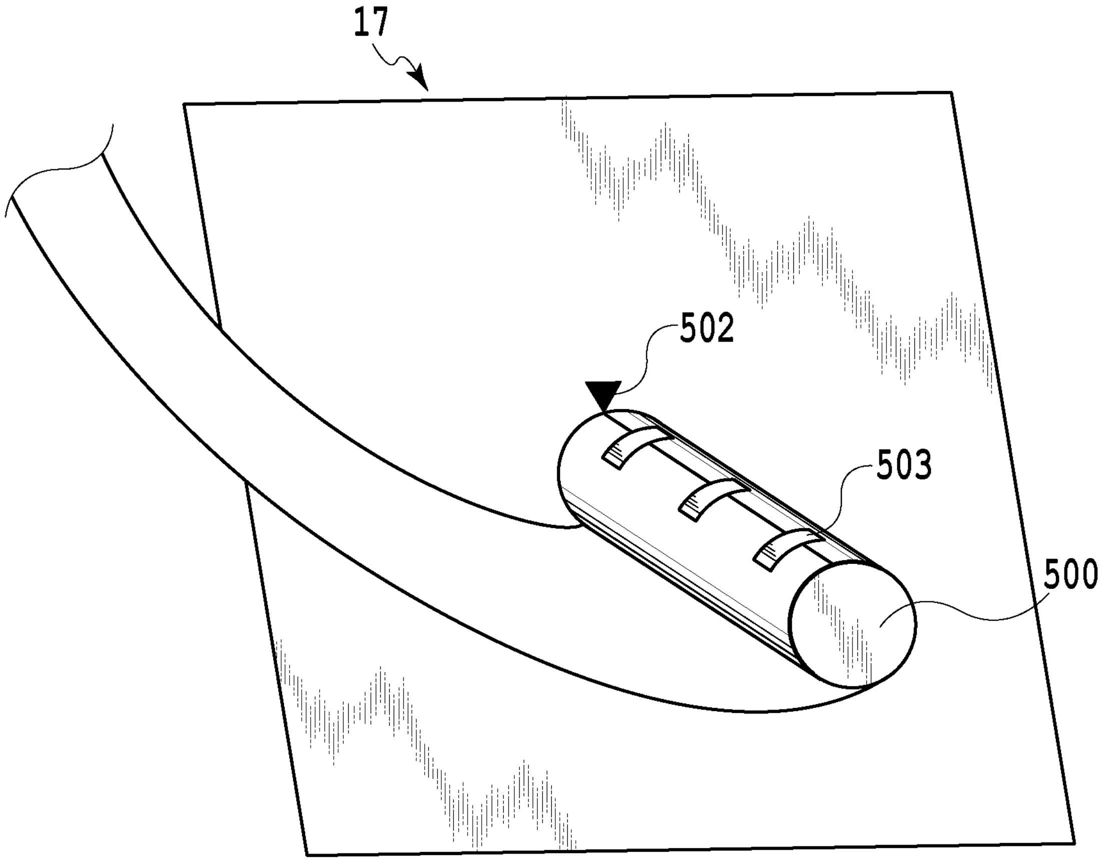
FIG. 8 is a diagram showing a roll sheet attaching shaft portion of a winding device.

FIG. 8 is a diagram showing a roll sheet attaching shaft portion of the winding device 17 and shows a state in which the front end of the print area for job B is attached to the winding device 17. A paper tube for attaching a roll sheet is attached to a winding shaft 500 for attaching and winding a roll sheet. The winding shaft 500 and the paper tube are fixed to each other by putting air into the winding shaft 500. At the time of detachment of the paper tube, the paper tube can be detached from the winding shaft 500 by extracting air from the winding shaft 500 and releasing the fixation of the paper tube and the winding shaft 500.

After cutting the roll sheet with scissors, a cutter, or the like, a user lowers the front end of the cut portion of the roll sheet as if to draw a C-shape and brings it to the winding shaft 500. The user then winds the roll sheet from below the winding shaft 500 in a counterclockwise direction in the drawing to align the front end of the print area for job B with a front end attaching position mark 502 indicated by an inverted triangle mark placed at the root of the winding shaft 500, and attaches the sheet to the paper tube with attaching tapes 503. In the example of the present embodiment, the front end attaching position mark 502 is provided at a position indicating that the front end is located at the uppermost part of the winding shaft 500 in the vertical direction.

Incidentally, the front end attaching position mark 502 may be at a position different from the uppermost part of the winding shaft 500 in the vertical direction and may be a different mark such as a line as long as it can show the position. Further, the mark may be placed on the winding shaft 500 such that a user can attach the front end to an easy-to-attach position and rotate the shaft for alignment.

In this manner, the printing apparatus can grasp the position of the front end of the print area for job B and perform printing with a reduced error at the time of printing the rest of the divided job B continuously from the printed area.

Incidentally, in a case where the cutting position is upstream of and away from the winding device 17 in the print direction and conveyance is required after cutting in order to attach the front end of the print area for job B, it is necessary to add the amount of the conveyance to the additional printing distance and divide the job in consideration of that length.

Figure 9:
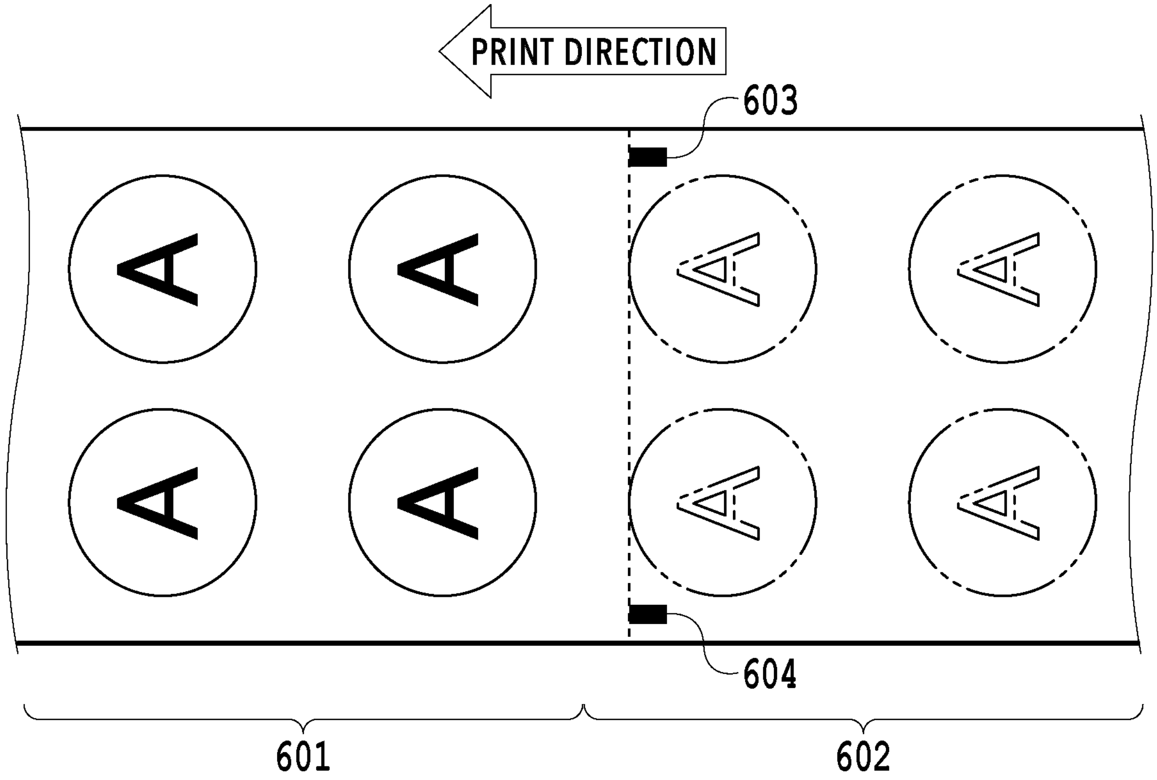
FIG. 9 is a diagram showing a rear end of a partial print area for a divided job.

FIG. 9 is a diagram showing the rear end of the partial print area for the divided job B. A print area 601 is an area that has been already printed and a print area 602 indicates an area yet to be printed. In a case where printing is temporarily stopped and then restarted in the same job, if what is printed in the job is a label to be attached to a product by a labeler, it is preferable that an error be small at the joint between jobs.

Thus, in the present embodiment, an eye mark is used for alignment before and after the divided job. After printing the print area 601 for the divided job, the printing apparatus of the present embodiment prints eye marks 603 and 604 at the joint between jobs for alignment of the print area 602 of the remaining job. The printing apparatus comprises an unshown sensor to sense the eye marks upstream of the head 13 and prints the eye marks 603 and 604 at a position that can be sensed by the sensor. In the present embodiment, the eye marks 603 and 604 are printed at the most upstream position to be printed at the restart of printing (at the restart of printing).

Incidentally, although the eye marks are printed at the most upstream position to be printed in the present embodiment, the position is not limited to this and may be a different position such as the rear end of the partial print area of the job.

In this manner, the printing apparatus can restart printing with a reduced error by performing printing in alignment with a to-be-printed position by the use of the signal of the eye marks 603 and 604.

Figure 10:
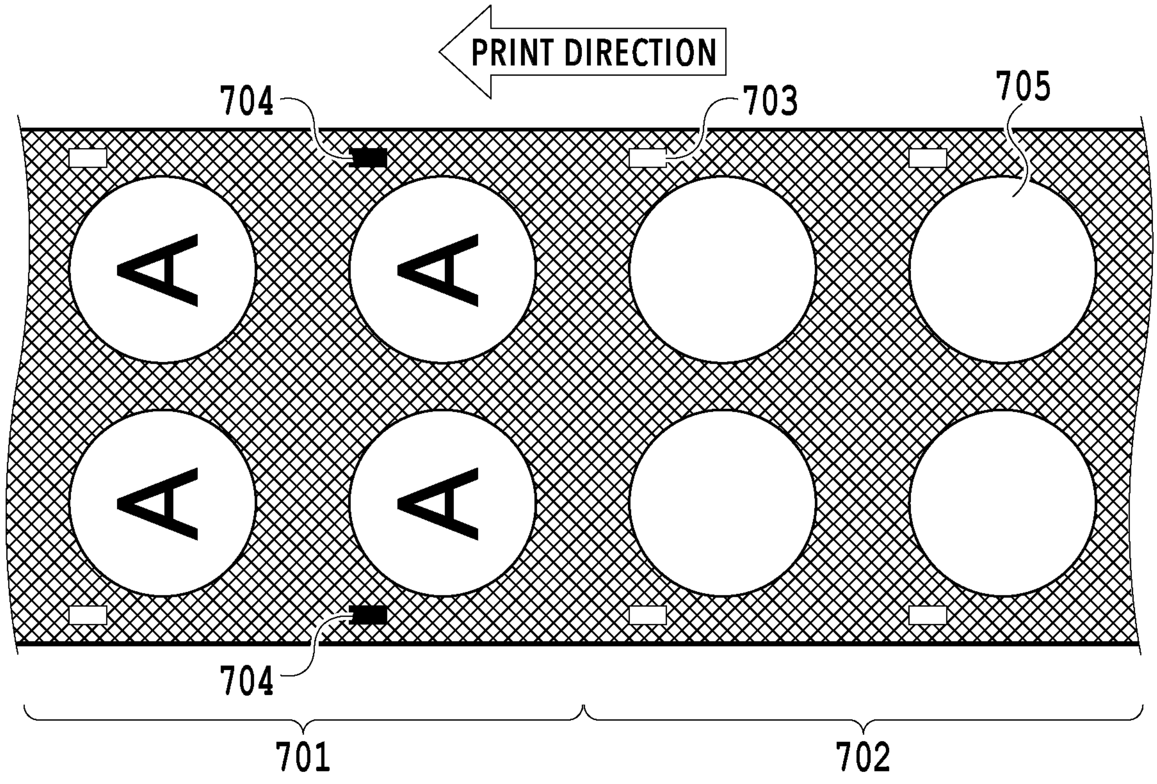
FIG. 10 is a diagram showing blank labels from which a print surface has been removed.

FIG. 10 shows blank labels obtained by performing half cutting in advance for a sticker sheet or the like and removing a part of the print surface not used as stickers. In the drawing, a hatched portion indicates the part not used as stickers and the print surface has been removed from here. A description will be given of a method for alignment at the restart of printing on such blank labels.

At the time of printing on blank labels, print positions are limited to the print surface left in white in the drawing, differently from the case in which the entire surface is a print surface. Thus, in the present embodiment, print areas for eye marks are left by performing half cutting also for portions having a possibility of being provided with eye marks like the label printing portions and the eye marks are printed on that portions. At the time of printing in a partial print area 701 for job B, as shown in the drawing, the printing apparatus of the present embodiment performs solid black printing for printing the entire surface of eye mark areas 703 corresponding to the last image for the divided job B to form eye marks 704. That is, the printing apparatus performs printing by ejecting black ink to the entire surface of the white eye mark areas 703.

Incidentally, although the solid black printing is performed for the eye mark areas 703 corresponding to the last image in the present embodiment, the printing is not limited to this; the position may be a further forward position and an image to be printed may be other than a solid black image.

As a result, at the time of printing a print area 702 for job B, after the eye marks 704 are detected by the use of the signal of these eye marks 704, printing can be performed in alignment with a to-be-printed position 705 by using the eye mark areas 703.

Although the sensor capable of sensing both black and white is shown as an example in the present embodiment, a sensor which only senses white may be used and printing may be performed from the next eye marks if eye marks cannot be sensed at a position where they should be sensed.

Although the solid black printing is performed for the eye mark areas 703 corresponding to the last image in the present embodiment, the solid black printing may be performed for eye mark areas 703 at the most upstream position to be printed.

As described above, whether to detach the deliverable after the completion of the job is determined and, if the deliverable is to be detached, a part or all of the next job is printed in the additional print area subsequently to the previous job. This makes it possible to provide a printing apparatus capable of reducing the production of waste paper, a method for controlling the printing apparatus, and a storage medium.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-181798 filed Nov. 14, 2022, which is hereby incorporated by reference herein in its entirety.

What is claimed is:

1. A printing apparatus comprising:

a printing unit configured to perform printing on a printing medium drawn out and conveyed from a roll based on an input job;

a winding unit configured to wind the printing medium printed by the printing unit into a roll;

a control unit configured to control printing for a first job and printing for a second job subsequent to the first job on the printing medium;

a feeding unit configured to supply the printing unit with the printing medium;

a setting unit configured to set whether a deliverable for the first job wound by the winding unit is to be detached after printing for the first job is finished, wherein in a case where the setting unit makes a setting to detach the deliverable, the control unit performs control such that at least a part of the second job is printed in a predetermined area continued from an area to print the first job on the printing medium before the deliverable for the first job is detached, after the printing unit finishes printing in the predetermined area, the control unit causes the feeding unit to convey the printing medium in an opposite direction of a supply direction in which the printing medium is supplied, a length of the predetermined area in the supply direction is a length obtained by adding a predetermined length necessary for printing to a length between the winding unit and the printing unit, and the printing unit performs printing by ejecting liquid to the printing medium; and further comprising a drying unit configured to dry the liquid ejected to the printing medium, wherein the predetermined length is a length obtained by adding a length of conveyance of the printing medium until a conveyance speed is stabilized to a length of conveyance of the printing medium after a temperature of the drying unit becomes equal to or greater than a certain temperature and until the temperature reaches a target temperature.

2. The printing apparatus according to claim 1, further comprising an adjusting unit configured to adjust image data for the second job and subsequent jobs in accordance with the predetermined area.

3. The printing apparatus according to claim 2, wherein in a case where the predetermined area is smaller than an area of the printing medium printed for the second job, the adjusting unit divides image data for the second job into image data to be printed before the deliverable for the first job is detached and image data to be printed after the deliverable for the first job is detached.

4. The printing apparatus according to claim 3, wherein in a case where the predetermined area is larger than an area of the printing medium printed for the second job, the adjusting unit divides image data for the second job and subsequent jobs into image data to be printed before the deliverable for the first job is detached and image data to be printed after the deliverable for the first job is detached.

5. The printing apparatus according to claim 1, wherein the control unit causes the feeding unit to convey the printing medium in the opposite direction until a rear end of an area printed for the first job in the supply direction reaches a position at which the printing medium can be cut.

6. The printing apparatus according to claim 1, wherein the winding unit is provided with a front end attaching position mark to align a position of a front end of a printing area for the second job after the deliverable for the first job is detached.

7. The printing apparatus according to claim 1, wherein the control unit causes the printing unit to print a cutting line at a rear end of an area of the printing medium printed for the first job in the supply direction.

8. The printing apparatus according to claim 1, wherein in a case where the setting unit makes a setting to detach the deliverable, the control unit causes the printing unit to print an eye mark for use in alignment at restart of printing for the second job at a joint between an image of the first job and an image of the second job.

9. The printing apparatus according to claim 1, wherein in a case where the second job is not input and the setting unit makes a setting not to detach the deliverable, the control unit performs printing for the first job and finishes a printing process.

10. A method for controlling a printing apparatus, the method comprising:

a printing step of performing printing on a printing medium drawn out and conveyed from a roll based on an input job;

a winding step of winding the printing medium printed in the printing step into a roll; and a control step of controlling printing for a first job and printing for a second job subsequent to the first job on the printing medium;

a feeding step of supplying the printing unit with the printing medium;

a setting step of setting whether a deliverable for the first job wound in the winding step is to be detached after printing for the first job is finished, wherein in a case where a setting to detach the deliverable is made in the setting step, control is performed in the control step such that at least a part of the second job is printed in a predetermined area continued from an area to print the first job on the printing medium before the deliverable for the first job is detached, after printing is finished in the predetermined area, the printing medium is conveyed in an opposite direction of a supply direction in which the printing medium is supplied, a length of the predetermined area in the supply direction is a length obtained by adding a predetermined length necessary for printing to a length between the winding unit and the printing unit, and printing is performed by ejecting liquid to the printing medium; and further comprising a drying step of drying the liquid ejected to the printing medium, wherein the predetermined length is a length obtained by adding a length of conveyance of the printing medium until a conveyance speed is stabilized to a length of conveyance of the printing medium after a temperature of the drying unit becomes equal to or greater than a certain temperature and until the temperature reaches a target temperature.

11. A non-transitory computer-readable storage medium storing a program which causes a computer to execute:

a printing step of performing printing on a printing medium drawn out and conveyed from a roll based on an input job;

a winding step of winding the printing medium printed in the printing step into a roll;

a control step of controlling printing for a first job and printing for a second job subsequent to the first job on the printing medium;

a feeding step of supplying the printing unit with the printing medium;

a setting step of setting whether a deliverable for the first job wound in the winding step is to be detached after printing for the first job is finished, wherein in a case where a setting to detach the deliverable is made in the setting step, control is performed in the control step such that at least a part of the second job is printed in a predetermined area continued from an area to print the first job on the printing medium before the deliverable for the first job is detached, after printing is finished in the predetermined area, the printing medium is conveyed in an opposite direction of a supply direction in which the printing medium is supplied, a length of the predetermined area in the supply direction is a length obtained by adding a predetermined length necessary for printing to a length between the winding unit and the printing unit, and printing is performed by ejecting liquid to the printing medium; and further comprising a drying step of drying the liquid ejected to the printing medium, wherein the predetermined length is a length obtained by adding a length of conveyance of the printing medium until a conveyance speed is stabilized to a length of conveyance of the printing medium after a temperature of the drying unit becomes equal to or greater than a certain temperature and until the temperature reaches a target temperature.

* * * * *